United States Patent
Veuillet et al.

(10) Patent No.: US 12,332,119 B2
(45) Date of Patent: Jun. 17, 2025

(54) METHOD FOR COUNTING PEOPLE AND DETERMINING THEIR POSITION IN A ROOM

(71) Applicant: Schneider Electric Industries SAS, Rueil Malmaison (FR)

(72) Inventors: Pierre Veuillet, Voiron (FR); Dominique Persegol, Grenoble (FR); Hector Pharam, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 280 days.

(21) Appl. No.: 18/187,406

(22) Filed: Mar. 21, 2023

(65) Prior Publication Data
US 2023/0314225 A1    Oct. 5, 2023

(30) Foreign Application Priority Data
Mar. 30, 2022   (FR) ...................................... 2202892

(51) Int. Cl.
| | |
|---|---|
| *G01J 5/00* | (2022.01) |
| *G06T 5/50* | (2006.01) |
| *G06V 10/25* | (2022.01) |
| *H04L 12/28* | (2006.01) |

(52) U.S. Cl.
CPC .............. *G01J 5/0025* (2013.01); *G06T 5/50* (2013.01); *G06V 10/25* (2022.01); *H04L 12/2803* (2013.01); *G01J 2005/0077* (2013.01)

(58) Field of Classification Search
CPC ........... G01J 5/0025; G06V 10/25; G06T 5/50
See application file for complete search history.

(56) References Cited

U.S. PATENT DOCUMENTS

| | | |
|---|---|---|
| 2012/0182427 A1 | 7/2012 | Marshall |
| 2017/0264882 A1* | 9/2017 | Helberg ................ G06T 3/4038 |
| 2018/0285650 A1 | 10/2018 | George et al. |
| 2020/0082551 A1* | 3/2020 | Steiner .................. G01S 5/0294 |
| 2020/0200608 A1* | 6/2020 | Williams ............... H04N 23/23 |
| 2022/0060785 A1* | 2/2022 | Woodruff ........... H04N 21/6582 |
| 2023/0043342 A1* | 2/2023 | Tremblay ............. H04N 23/698 |
| 2023/0069029 A1* | 3/2023 | Nguyen ................. G06V 20/00 |

OTHER PUBLICATIONS

Gomez, Andres et al., "Thermal Image-Based CNN's for Ultra-Low Power People Recognition", Proceedings of the 15th ACM International Conference on Computing Frontiers, May 8, 2018, pp. 326-331.

French Search Report and Written Opinion dated Oct. 24, 2022 for corresponding French Patent Application No. FR 2202892, 10 pages.

* cited by examiner

*Primary Examiner* — Hugh Maupin
(74) *Attorney, Agent, or Firm* — Troutman Pepper Locke LLP

(57) ABSTRACT

A method for counting and for determining the position of people in a room, the method including: activating a thermal imager; the thermal imager capturing a raw thermal image of a scene included in the room; deactivating the thermal imager; after deactivating the thermal imager, acquiring a calibrated thermal image of the scene from the raw thermal image; comparing the calibrated thermal image of the scene with another calibrated thermal image of the scene acquired beforehand; and acquiring the number of people and the position of the people in the room.

10 Claims, 6 Drawing Sheets

METHOD FOR COUNTING PEOPLE AND DETERMINING THEIR POSITION IN A ROOM

TECHNICAL FIELD

The present disclosure relates to the field of methods for counting people and for determining the position of these people in a room of a building.

PRIOR ART

In building management, the use of a video recording device is known for implementing methods for counting people and for determining their position in a room of a building. For example, the video recording device can be a thermal imager that generates videos allowing each person present in the room to be identified by their temperature difference with respect to other bodies present in this room.

Generally, the thermal imager is configured to continuously record videos of a scene in this room and to enter, only at certain times, a standby mode where it remains on without recording. Such a thermal imager is therefore highly energy intensive, such that it is very expensive to operate. In addition, the high energy consumption means that the thermal imager must be electrically powered using cables, as the use of batteries does not guarantee the autonomy of the thermal imager over a long period of time.

Moreover, video recording should only occur when the imager is thermally stable, i.e., when the temperature of the imager is constant throughout recording. Indeed, if the temperature of the imager fluctuates when recording videos, the temperature differences between the various bodies in the room are distorted, thus increasing the risk of identifying an inaccurate number of people in the room. Conventionally, the thermal stability of the imager at the start of video recording is achieved by waiting approximately 10 seconds after the thermal imager is turned on, which represents a significant waste of time and energy. In addition, this does not prevent temperature variations of the imager when recording, with these variations possibly being due to a variation in the ambient temperature or to self-heating of the imager, among other reasons.

SUMMARY

The present disclosure improves the situation.

To this end, a method is proposed for counting people and for determining the position of said people in a room of a building, the method comprising the steps of:
a) activating a thermal imager;
b) the thermal imager capturing a raw thermal image of a scene included in said room;
c) deactivating the thermal imager;
d) after deactivating the thermal imager, acquiring a calibrated thermal image of the scene from said raw thermal image, the calibrated thermal image of the scene comprising at least one region of interest, with each region of interest being a hot spot corresponding to a respective person present in the scene;
e) comparing the calibrated thermal image of the scene with another calibrated thermal image, called calibrated comparison thermal image;
f) acquiring the number of people and the position of said people in the room.

By virtue of the deactivation of the thermal imager before the step of acquiring the calibrated thermal image, the time during which the imager is activated is very short, which allows energy to be saved and an energy-saving method for counting people and for determining their position to be obtained. This also allows a battery powered thermal imager to be used for implementing this method, while ensuring that it has sufficiently long autonomy, in particular of more than 10 years.

Finally, as the time during which the thermal imager is activated is very short, there is no need to wait for the imager to be thermally stable in order for the raw thermal image to be captured.

According to another aspect, step e) comprises subtracting the calibrated comparison thermal image from the calibrated thermal image of the scene so as to maintain the at least one region of interest in the calibrated thermal image of the scene.

According to another aspect, the method further comprises, prior to step e), applying at least one filter for identifying people to the calibrated thermal image of the scene in order to identify the at least one region of interest from among the at least one hot spot.

According to another aspect, an elapsed time between step a) and step c) is less than 1 s, preferably less than 50 ms, more preferably less than or equal to 20 ms.

According to another aspect, the calibrated comparison thermal image is acquired between 1 min and 4 min before step a), preferably between 1 min and 2 min before step a).

According to another aspect, the calibrated thermal image of the scene is acquired without operating a shutter of the thermal imager.

According to another aspect, the method further comprises measuring the temperature of the thermal imager substantially concomitantly with step b).

According to another aspect, the method further comprises acquiring another calibrated comparison thermal image from the subtraction of the regions of interest from the calibrated thermal image.

According to another aspect, a thermal imager is proposed, preferably with low resolution, comprising an array of thermal sensors, a lens and a computer device, with the thermal imager being configured to implement the method described above.

According to another aspect, a home automation detector is proposed comprising the thermal imager described above.

According to another aspect, a computer program is proposed comprising instructions for implementing all or part of a method as defined herein when this program is run by a processor. According to another aspect, a non-transitory, computer-readable storage medium is proposed, on which such a program is recorded.

BRIEF DESCRIPTION OF THE DRAWINGS

Further features, details and advantages will become apparent from reading the following detailed description, and from analyzing the accompanying drawings, in which.

DESCRIPTION OF THE EMBODIMENTS

Figure 1:
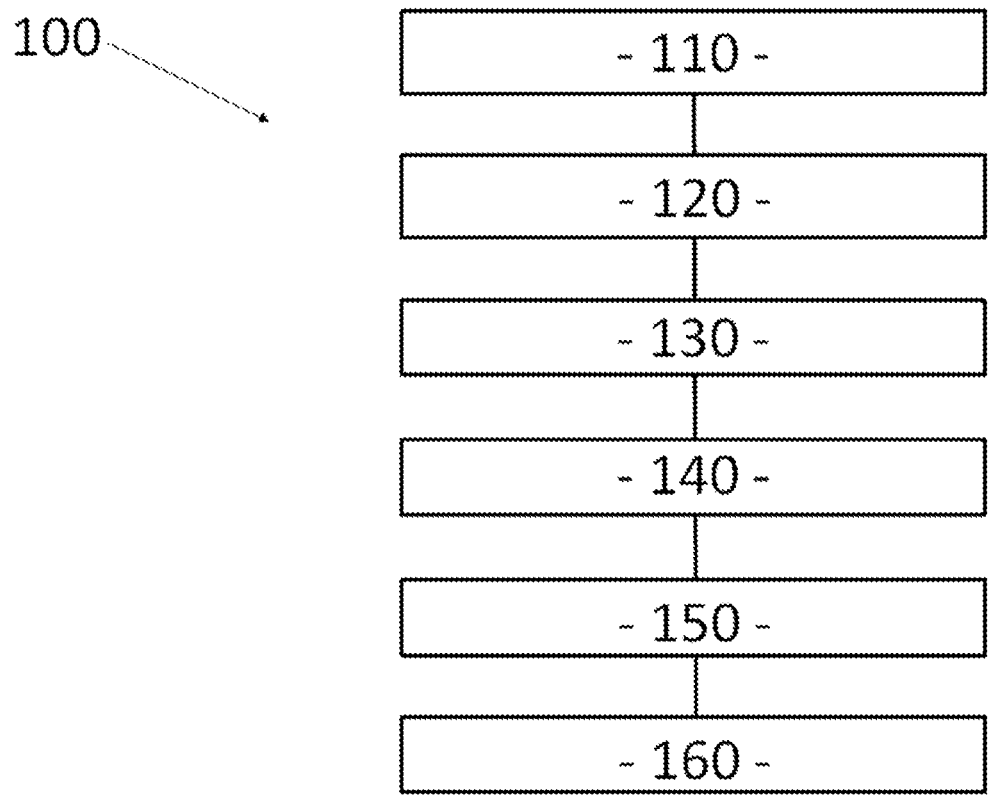
FIG. 1 shows a flow chart of a method for counting people and for determining the position of said people in a room of a building according to one embodiment.

A method 100 for counting people and for determining the position of these people in a room of a building will now be described with reference to FIG. 1.

"Building" is understood to mean any property construction, such as a block, a flat, an office, etc. The room of a building can be an internal part of the building, for example, a room or an area of a room, or an external part of the building, for example, a balcony, a courtyard or a garden.

Figure 2:
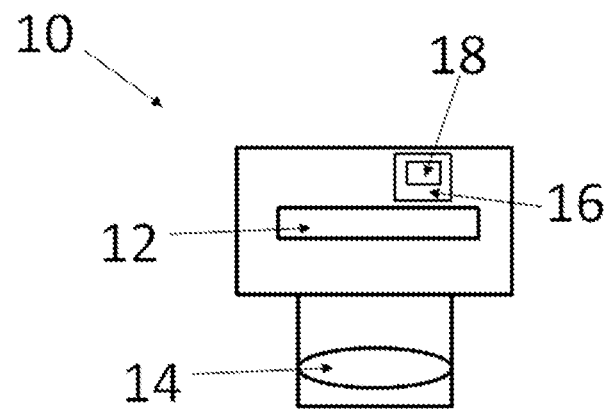
FIG. 2 shows a schematic longitudinal section view of an example of a thermal imager for implementing the method of FIG. 1.

The method 100 comprises a first step 110 of activating a thermal imager 10, as shown in FIG. 2.

As will be described hereafter, the thermal imager 10 is configured to capture a raw thermal image of a scene within the room of a building. The scene can comprise the whole of the selected room of the building or a portion of this room. "Raw image" is understood to mean an image of the scene that has not been post-processed or calibrated.

The thermal imager 10 is, for example, an infrared thermal imager. In this case, the imager 10 is configured to obtain the raw thermal image from the absorption of the infrared radiation emitted by the various bodies present in the scene. "Body" is understood to mean any living being or any object present in the scene. Thus, the body can be a person, an animal, a plant, an electronic device, a piece of furniture or a wall within the scene, among other things.

According to a non-limiting example, the thermal imager 10 comprises an array 12 of elementary thermal sensors, also called infrared sensors, and a lens 14.

An infrared sensor is configured to absorb the infrared radiation emitted by the bodies present in the scene. The infrared radiation absorbed by the sensor array 12 causes a physical quantity to vary on each infrared sensor that depends on the amount of infrared radiation that is absorbed. It is known that the higher the temperature of a body, the more infrared radiation this body emits, which increases the amount of infrared radiation that is absorbed by the infrared sensor. The infrared sensor thus generates various signals depending on the temperature of each body present in the scene.

Each infrared sensor is, for example, a long-wave infrared imaging sensor, which allows the infrared radiation emitted by each body to be detected even in the absence of light.

Advantageously, the infrared sensors of the array 12 are organized as a matrix in n rows and n columns.

The infrared sensors are bolometers, for example. In a bolometer or a microbolometer, the signals for acquiring the raw thermal image are generated by the sensor 12 from a variation in its electrical resistance. In particular, heating of the sensor 12 that is caused by the absorption of infrared radiation causes the electrical resistance of the sensor 12 to vary. The value of the variation in electrical resistance is associated with specific temperatures.

Alternatively, the infrared sensors of the array 12 can be pyroelectric sensors or pneumatic sensors.

In the case of a pyroelectric sensor, the heating of the sensor that is caused by the absorption of infrared radiation generates surface currents in the sensor that are directly proportional to the temperature increase.

In the case of a pneumatic sensor, the absorbed infrared radiation generates a temperature increase inside a chamber filled with a gas. The pressure of the gas in the sensor increases as the temperature in the chamber increases.

According to another alternative embodiment, the infrared sensors can be thermopile sensors.

The signals generated by the array 12 of thermal sensors therefore depend on the temperature of each body in the scene S.

Advantageously, the sensor array 12 operates at ambient temperature. The thermal imager 10 is therefore an uncooled thermal imager.

Preferably, the thermal imager 10 is an imager devoid of a shutter, without this being limiting. The shutter is a mechanical part that is disposed in front of the array 12 of thermal sensors and that can move between an operating position of the thermal imager 10 and a shutter position of the thermal imager 10. This movement is controlled by a motor, in particular an electric motor. In the operating position, the thermal imager 10 can acquire the raw thermal image of the scene as explained above. In the shutter position, the shutter inserts itself between the sensors of the array 12 and the bodies in the scene, so that absorption of the infrared radiation emitted by the bodies in the scene is impossible and the raw thermal image of the scene cannot be generated. Instead, in the shutter position of the shutter, the thermal imager 10 generates a reference image relative to the temperature of the imager, which is therefore a temperature-uniform image.

A computer device 16 also can be arranged in the thermal imager 10. The device 16 advantageously operates independently of the activation or deactivation state of the thermal imager 10. "Deactivation" (also called "powering off") is understood to mean that the power supply to the thermal imager 10 is cut-off.

Even though in the example shown in FIG. 2, the computer device 16 is integrated in the thermal imager 10, it could be an external device connected to the thermal imager 10. The computer device 16 comprises a processor 18. The processor 18 is involved in implementing steps 120 and 140 to 160 of the method 100 that will be explained hereafter.

The thermal imager 10 is disposed at a high point above the floor of the room, in particular at a height that allows it to be above any person present in the room. For example, the installation height of the thermal imager 10 is greater than or equal to 2.2 m. In the case of an indoor room, the thermal imager 10 is, for example, installed on the ceiling. In the case of an outdoor room, the thermal imager can be installed against a wall defining the room or on a high point of a high element included in the room, for example, a lamp post.

Figure 3:
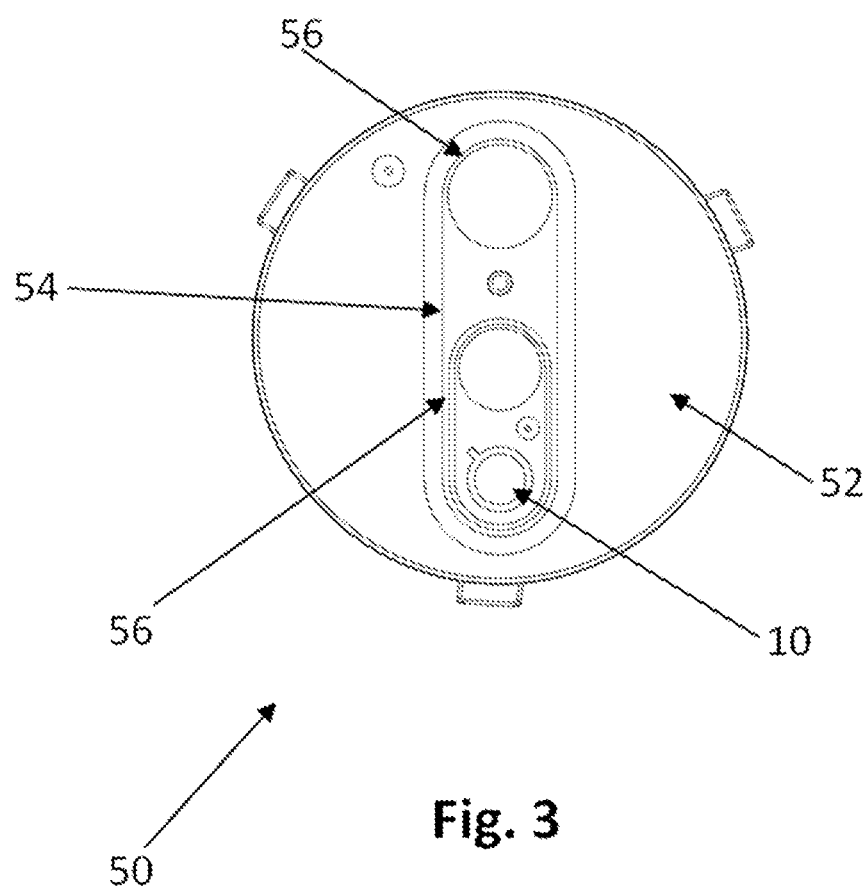
FIG. 3 shows a schematic front view of a home automation detector comprising the thermal imager of FIG. 2.

In some cases, the thermal imager 10 is integrated into a home automation detector 50, as shown in FIG. 3. The home automation detector 50 comprises a housing 52, inside which the thermal imager 10 is arranged.

In FIG. 3, the thermal imager 10 is included in a sensor module 54. The sensor module 54 can further comprise a plurality of sensors 56 of various types. For example, the sensors 56 can be an ambient noise sensor, an ambient light sensor, etc. Advantageously, one of the sensors 56 of the home automation detector is a motion sensor, in particular a passive infrared sensor, also called "PIR (passive infrared) sensor". The PIR sensor is configured to detect the variation in infrared radiation that occurs when a person moves in the room. To this end, the PIR sensor senses the temperature difference that exists between the human body and the floor, the walls and other bodies in the room.

Figure 4:
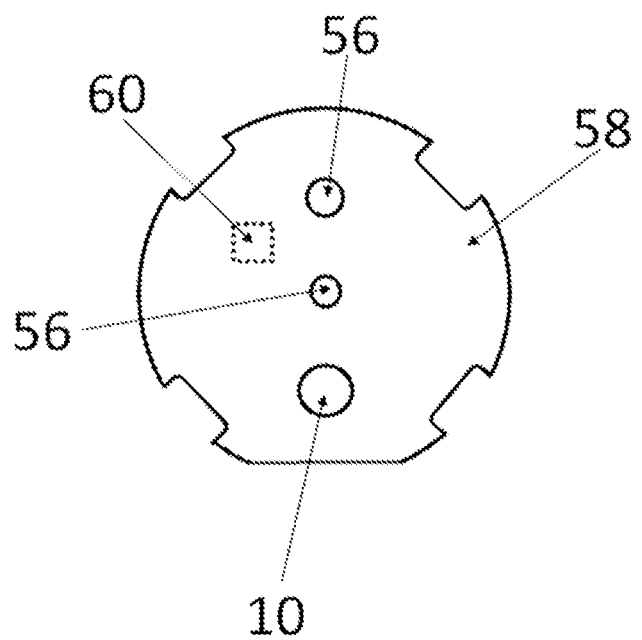
FIG. 4 shows a schematic front view of an electronic board of the home automation detector of FIG. 3.

As shown in FIG. 4, the thermal imager 10 and the sensors 56 can be soldered onto an electronic board 58 of the home automation detector 50. This electronic board 58 is arranged inside the housing 52. The electronic board 58 allows the various signals transmitted by the thermal imager 10 (including the computer device 16) and the sensors 56 to be recovered. The electronic board 58 also allows the sensors 56, the imager 10 and the computer device 16 to be electrically powered.

The home automation detector 50, and in particular its electronic board 58, can be electrically powered by a cable or by a battery.

Preferably, the thermal imager 10 and the home automation detector have low power consumption. To this end, the thermal imager 10 has low resolution, for example. "Low resolution" is understood herein to mean resolution ranging between 20×20 pixels and 150×150 pixels, preferably between 32×32 pixels and 100×100 pixels.

The activation 110 of the thermal imager 10 can be carried out remotely or by direct activation of a man-machine interface provided on the imager 10 or on the home automation detector 50.

The method 100 then comprises a step 120 of capturing the raw thermal image of the room scene, as described above.

Figure 5:
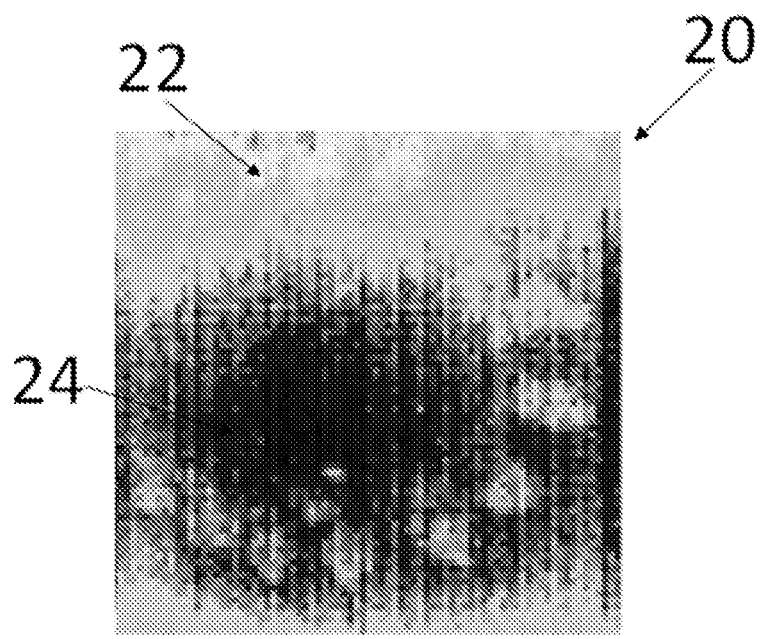
FIG. 5 shows a raw thermal image of a scene of the room acquired when applying the method of FIG. 1.

As already explained, the thermal imager 10 is configured to acquire the raw thermal image from the absorption by the array 12 of thermal sensors of the infrared radiation emitted by the various bodies present in the scene. Each thermal sensor thus generates signals that are transmitted to the computer device 16 of the imager 10. The processor 18 processes these signals in order to generate the raw thermal image. FIG. 5 shows an example of a raw thermal image 20.

Any thermal image comprises a plurality of pixels. Each pixel represents a specific temperature point of a body present in the scene. Depending on the temperature of the respective point, each pixel in the thermal image can be represented by a specific colour tone. This colour tone can be associated with a specific temperature value or temperature range. Furthermore, the thermal image includes light spots 22 and dark spots 24 that help identify the various heat sources present in the scene.

However, as is clearly apparent from FIG. 5, in the raw thermal image the boundaries of the light spots 22 and the dark spots 24 are blurred. The raw thermal image reveals the positioning of each sensor of the array 12, and more specifically a non-uniformity ("pixelation effect") due to the difference in signals generated by each sensor. Furthermore, the raw thermal image has a columnar appearance. In addition, the raw thermal image does not allow reliable information to be acquired concerning the temperatures associated with each pixel in the image. Consequently, the raw image 20 cannot be used as is and requires additional processing, as will be described hereafter.

Advantageously, when capturing the raw thermal image 20, a measurement is taken of the temperature of the thermal imager 10. To this end, the thermal imager is connected to a temperature sensor 60. According to a non-limiting example, the temperature sensor 60 can be arranged on the electronic board 58 of the home automation detector 50. In particular, as shown in FIG. 4, the temperature sensor 60 can be disposed on a face of the electronic board 58 opposite the face on which the thermal imager is soldered. Advantageously, the temperature measurement of the thermal imager 10 is carried out at substantially the same time as the raw thermal image 20 is captured.

After capturing the raw thermal image, the method 100 comprises deactivating 130 the thermal imager 10. The deactivation 130 of the thermal imager 10 can be carried out remotely or by direct activation of the man-machine interface provided on the imager 10 or on the home automation detector 50.

This deactivation 130 preferably occurs immediately after the raw thermal image 20 is captured 120. In addition, an elapsed time between the activation 110 and the deactivation 130 of the thermal imager 10 is very short. For example, the elapsed time between the activation 110 and the deactivation 130 of the thermal imager is less than 1 s, preferably less than 50 ms, more preferably less than or equal to 20 ms.

The deactivation of the thermal imager 10 allows energy to be saved, because the time during which the thermal imager 10 is activated is very limited. Moreover, as this time is very short, it is not necessary to wait for the thermal imager 10 to reach thermal stabilization in order to be able to capture the raw thermal image 10, and the risk of thermal variations in the imager 10 when capturing 120 the image is very low. Indeed, with a short activation time of the imager 10, the imager 10 does not have time to self-heat when capturing 120 the raw thermal image 20, and the ambient temperature also does not risk being changed. The measurement of the temperature of the thermal imager 10 by the temperature sensor 60, as explained above, is therefore sufficient to obtain a calibrated thermal image, as will be described hereafter.

The method 100 comprises a step 140 of acquiring such a calibrated thermal image. This step 140 of acquiring the calibrated thermal image preferably occurs after the deactivation 130 of the thermal imager 10.

During step 140, a thermal image calibration algorithm is applied to the raw thermal image 20. Such an algorithm allows the calibrated thermal image to be acquired, which is temperature-compensated and free of a pixelation effect and a columnar appearance. "Temperature-compensated" is understood herein to mean that the calibration algorithm takes into account the temperature of the thermal imager 10 measured by the sensor 60 when capturing 120 the raw thermal image 20. This allows a calibrated thermal image to be acquired in which the presence of light and dark spots is independent of the temperature of the thermal imager 10. Furthermore, taking into account the temperature of the thermal imager 10 allows an accurate temperature to be acquired for each pixel in the raw thermal image 20.

Examples of calibration algorithms that can be used during step 140 of the present method are described in patent applications FR 3111699 A1, FR 3083901 A1 or FR 3088512 A1. These algorithms use low computational loads, thus reducing the energy and the time required to implement them. In particular, these algorithms allow the calibrated thermal image to be acquired in less than 50 ms, for example, in 10 ms. Moreover, these algorithms are more generally known as shutterless algorithms. Such a shutterless algorithm is an algorithm that allows the raw thermal image to be calibrated without having to generate the reference image relating to the temperature of the imager described above. In addition, these algorithms can be used to obtain the calibrated thermal image from a shutterless thermal imager, thus reducing the footprint of the imager that is used. Furthermore, even if the thermal imager is provided with a shutter, with these algorithms the electric motor of the shutter does not need to be activated in order for the shutter to transition from the operating position to the shutter position of the thermal imager 10. Energy consumption is therefore reduced by virtue of these shutterless algorithms.

Figure 6:
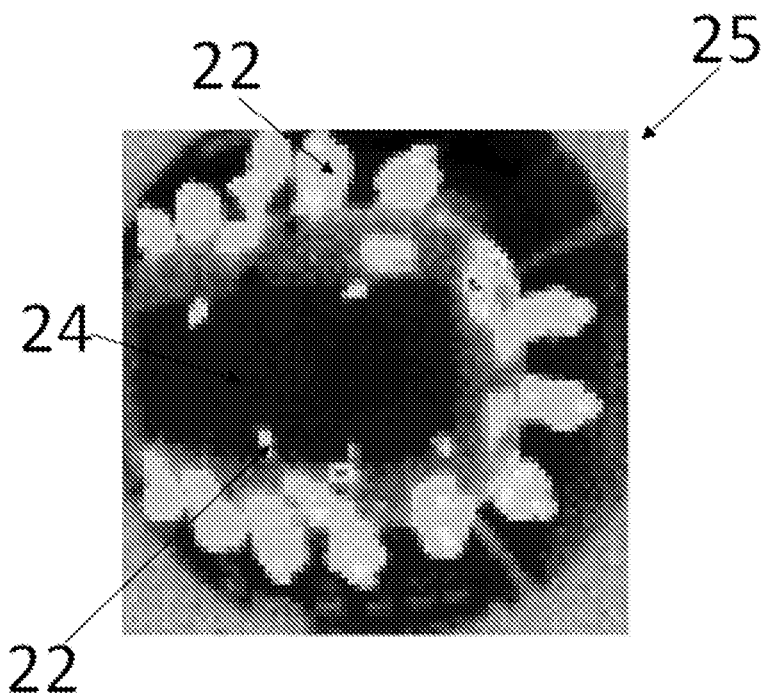
FIG. 6 shows a calibrated thermal image acquired by applying one of the steps of the method of FIG. 1 to the raw thermal image of FIG. 5.

FIG. 6 shows a calibrated thermal image 25 acquired for the raw thermal image of FIG. 5. As can be seen from FIG. 6, in the calibrated thermal image 25 the light spots 22 and the dark spots 24 are clearly defined, so that reliable information can be acquired concerning the temperatures associated with each pixel in the calibrated thermal image 25. The various bodies in the scene therefore can be distinguished as a function of their temperature and/or their shape.

In the image 25 of FIG. 6, the light spots 22 correspond to bodies whose temperature is within a given temperature range, called reference temperature range, while the dark spots 24 correspond to bodies whose temperature is outside the reference temperature range. For the sake of clarity, hereafter the light spots 22 will also be called "hot spots", and the dark spots 24 will also be called "cold spots". However, it should be noted that this correspondence between hot spots/light spots and cold spots/dark spots is not limiting. It also should noted that the temperature of the cold spots 24 is generally lower than the temperature of the hot spots 22, but the opposite is also possible. In other words, the temperature of the cold spots can be either below the lower limit of the reference temperature range or above the upper limit of the reference temperature range.

The reference temperature range in this case corresponds to the temperature range within which the temperature of a person present in the scene can be located. Any person present in the scene would therefore appear in the calibrated thermal image as a hot spot 22. Hereafter, the hot spots 22 occupied by people will be called "regions of interest". The temperature of a person in the scene can vary, for example, between 20° C. and 40° C. depending on the clothing of the person.

The method 100 then comprises a step 150 of comparing the calibrated thermal image 25 with a calibrated thermal image of the same scene acquired previously, which is referred to herein as a "calibrated comparison thermal image".

The calibrated comparison thermal image in particular is a calibrated thermal image acquired by the thermal imager 10 during a previous application of the method 100, in particular at an instant t0, and in which the regions of interest identified at the instant t0 have been removed. The instant t0 occurs, for example, between 1 min and 4 min before the step 110 of activating the thermal imager 10, preferably between 1 min and 2 min before this activation step 110. In other words, the calibrated comparison thermal image is a calibrated thermal image acquired by the thermal imager 10 while applying the method 100 at the instant t0, in which image only those hot spots that did not correspond to people at this instant t0 were maintained. According to one example, the calibrated comparison thermal image is acquired 2 min before the activation 110 of the thermal imager 10. Such a time lag between the calibrated thermal image and the calibrated comparison thermal image allows the evolution of the hot spots 22 in the scene to be regularly monitored, while avoiding consuming excessive amounts of energy. The calibrated comparison thermal image can be transiently stored in the computer device 16.

The calibrated comparison thermal image has a similar appearance to the calibrated thermal image 25. In particular, the calibrated thermal image also includes hot spots and cold spots. Advantageously, as indicated above, the calibrated comparison thermal image does not include regions of interest. For the sake of clarity, hereafter the hot and cold spots of the calibrated comparison thermal image will be respectively called "hot comparison spots" and "cold comparison spots".

The comparison 150 between the calibrated thermal image and the calibrated comparison thermal image includes the subtraction of the calibrated comparison thermal image and the calibrated thermal image 25. More specifically, the calibrated comparison thermal image is subtracted from the calibrated thermal image 25.

Figure 7:
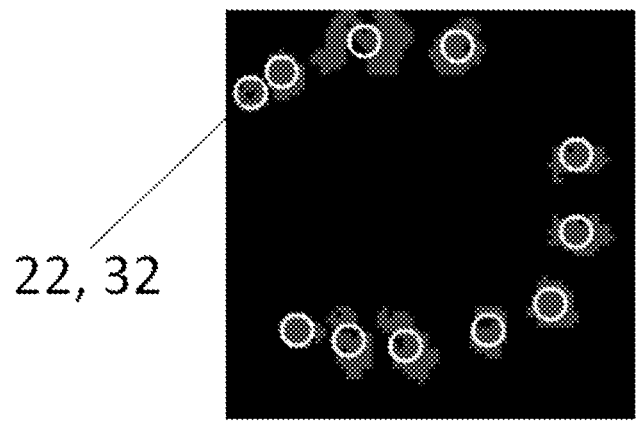
FIG. 7 is an image showing regions of interest in the calibrated thermal image of FIG. 6.

As indicated above, any person present in the scene appears in the calibrated thermal image 25 as a hot spot 22. However, other bodies with a temperature within the reference temperature range, such as an operating electronic device, can be located in the scene. Consequently, such bodies also appear as hot spots 22 on the calibrated thermal image 25. Subtracting the calibrated comparison thermal image from the calibrated thermal image 25 allows the hot spots 22 that were already present in the scene at the instant t0, and that were not regions of interest, to be removed from the calibrated thermal image 25. The subtraction of the calibrated thermal image and the calibrated comparison thermal image thus allows identification, from among the hot spots 22 of the calibrated thermal image 25, of those spots that correspond to regions of interest 32 (FIG. 7) as defined above.

In order to improve the accuracy in determining the regions of interest 32, several filters for detecting people can be applied to the calibrated thermal image 25. In particular, such filters allow a hot spot 22 to be identified that appeared in the scene when the calibrated thermal image 25 was generated with respect to the comparison thermal image and that does not correspond to a region of interest 32.

Figure 8:
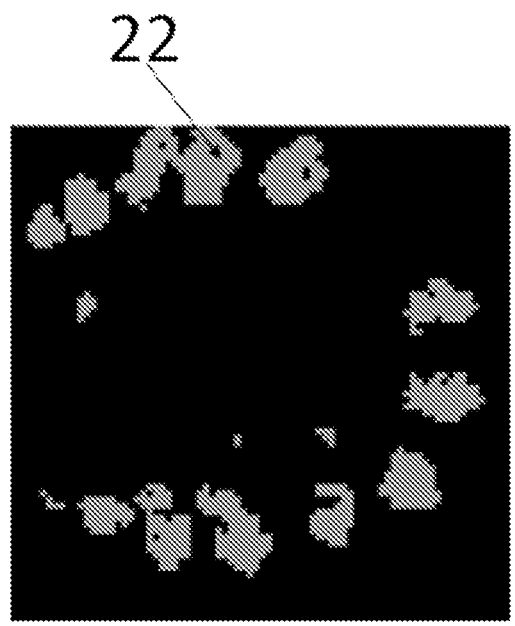
FIG. 8 is an image showing hot spots of the calibrated thermal image of FIG. 6.
Figure 9:
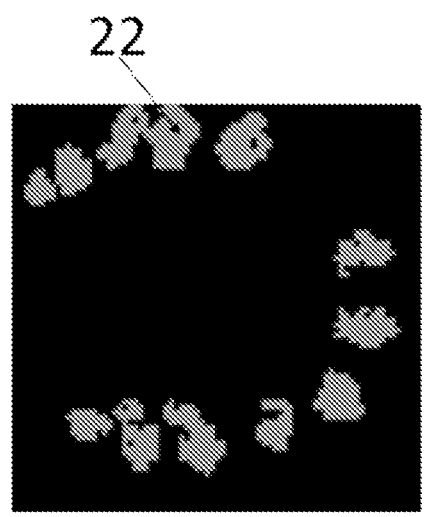
FIG. 9 is an image acquired after applying a filter to the image of FIG. 8.

The filter for detecting people can be a size filter that allows small hot spots 22 to be removed from the calibrated thermal image. Such spots correspond to hot spots 22 with a number of pixels that is less than a threshold value corresponding to the minimum number of pixels that is usually associated with a person. The effect of such a filter can be seen in FIGS. 8 and 9. Indeed, in the image of FIG. 8, some hot spots (which, as indicated, correspond to light spots) are smaller than the other hot spots 22. After applying the size filter, these smaller hot spots are removed from the calibrated thermal image, as shown in FIG. 9.

The filter for detecting people also can be a filter for identifying people as a function of the temperature differences between the pixels of the hot spots 22. It is known that, in general, the head of a person is warmer than the rest of the body. Therefore, when a certain number of pixels in the hot spot 22 have a higher temperature than the rest of the pixels in the hot spot, the hot spot potentially corresponds to a person.

All these types of filters have the advantage of being easily implemented without consuming significant amounts of power. Other types of filters for distinguishing a person from the other bodies occupying hot spots in the calibrated thermal image can be applied thereto. Of course, several different filters for detecting people can be applied to the calibrated thermal image 25 in order to more accurately identify the regions of interest 32.

When no calibrated comparison thermal image is available, for example, when the thermal imager has only just been installed in the room, the method 100 can anticipate acquiring a calibrated thermal image of the scene when no person is located in the scene. Hereafter, such an image will be referred to as "background thermal image". This background thermal image thus includes the hot spots 22 of the scene that are not regions of interest (for example, a radiator)

and the cold spots 24, so that the background thermal image can be used as a calibrated comparison thermal image. The comparison step 150 then can be implemented from the calibrated thermal image 25 and the background thermal image in the same way as explained above for the comparison step 150 implemented from the calibrated thermal image 25 and the calibrated comparison thermal image generated at the instant t0.

In order to obtain the background thermal image, the PIR sensor of the home automation detector 50 can be used to detect the moment when no movement occurs in the scene. Indeed, as people have the ability to move, lack of movement in the scene for a certain period of time, for example, for 2 minutes, indicates that potentially no person is present in the scene. This allows the background thermal image to be acquired without any region of interest 32. Of course, any other sensor for detecting the absence of people in the scene can be used.

Subtracting the calibrated thermal image 25 and the calibrated comparison thermal image allows the computational load to be reduced at the time of the comparison 150. In addition, the energy consumed by this comparison step 150 is reduced, which also allows the detection of regions of interest 32 to be accelerated.

Alternatively, the comparison 150 of the calibrated thermal image and the calibrated comparison thermal image can include identifying regions of interest 32 from the comparison of the positions of the hot regions 22 and the hot regions of interest. This identifies whether one of the hot spots 22 has changed position during the time that has elapsed between acquiring the calibrated thermal image 25 and the calibrated comparison thermal image. It is therefore sufficient to compare the position of each hot spot 22 and the corresponding comparison hot spot. A change in position of a hot spot 22 relative to the respective comparison hot spot indicates that this hot spot 22 is potentially occupied by a moving body, such as a person. Thus, such a hot spot 22 potentially corresponds to a region of interest 32.

Step 160 of the method 100 corresponds to acquiring the number of people and their position in the room.

From the comparison 150 of the calibrated thermal images and the calibrated comparison thermal images, the number of people in the room is acquired from counting the number of regions of interest 32 identified during the comparison 150. Similarly, as the calibrated thermal image shows the position of each hot spot 22 in the scene, it is possible to determine the position of the regions of interest 32 in this scene. This therefore allows the position of people in the room to be acquired. According to one example, the position of the people that is acquired is expressed as Cartesian coordinates relative to an orthonormal reference frame, the origin of which corresponds to the optical centre of the lens 14 of the thermal imager 10.

Advantageously, steps 150 and 160 are carried out in a time of less than 1 s, preferably less than 50 ms. By virtue of the simplification of the computations acquired by subtracting the calibrated comparison thermal image from the calibrated thermal image 25, steps 150 and 160 can be carried out in a time of 20 ms or less.

In addition, the method 100 according to the present disclosure can be implemented in its entirety in a time of even less than 1 s, which has significant advantages over the prior art in terms of cost, speed and consumed energy.

Preferably, the method 100 is repeated at intervals ranging between 1 min and 4 min, preferably between 1 min and 2 min. During the time between two successive applications of the method 100, the thermal imager is completely deactivated, thereby saving energy.

In some cases, in order to further reduce energy consumption, the method 100 can anticipate stopping before the step 150 of comparing the calibrated thermal image 25 with the calibrated comparison thermal image. Such cases can occur, for example, if hot spots 22 or regions of interest 32 are not detected in the scene. This avoids the energy consumption associated with step 150 when no person is present in the scene, while ensuring that calibrated thermal images 25 are acquired regularly, which allows the full implementation of the method 100 to be resumed quickly after a hot spot 22 appears in the scene. According to an alternative embodiment, when no hot spot 22 is detected during a prolonged time interval, for example, of more than 10 min, the method 100 can be fully implemented every 10 to 20 min, and partially every 1 to 4 min, preferably every 1 to 2 min. "Partially implemented" is understood herein to mean that the method stops before step 150, as explained above.

It should be noted that, from the calibrated thermal image 25 acquired by applying the method 100, the calibrated comparison thermal image can be acquired, which can be used during a subsequent implementation of the method 100. Thus, more energy is saved, as new thermal images of the scene do not need to be taken in order to generate the calibrated comparison thermal image.

In order to acquire the calibrated comparison thermal image from the calibrated thermal image 25, the regions of interest 32 simply need to be removed from the calibrated thermal image 25, while retaining all the other hot spots 22.

Preferably, the calibrated comparison thermal image acquired from implementing the method 100 is used for implementing the method 100 immediately afterwards. This allows the calibrated comparison thermal image to be used that reflects the most recent situation in the scene of hot spots 22 that are not regions of interest 32.

As indicated above, steps 120 and 140 to 160 are implemented by the computer device 16, which may or may not be integrated in the thermal imager. Advantageously, the data sent outside the computer device 16 are the number of people and the coordinates of the position associated with each of them. The raw and calibrated thermal images are not transmitted outside the computer device 16. Consequently, the method 100 complies with the provisions of the General Data Protection Regulation (GDPR).

A further aim of the present disclosure is a computer program comprising instructions for implementing the method 100 as described above when this program is run by a processor. In particular, the processor can be the processor 18 of the computer device.

A further aim of the present disclosure is a non-transitory computer-readable recording medium, on which the program for implementing the method described above is recorded.

The present disclosure is not limited to the examples of a method, a thermal imager, a home automation detector, a computer program and a recording medium that are described above solely by way of an example, but it encompasses all the alternative embodiments that can be contemplated by a person skilled in the art within the scope of the sought after protection.

The invention claimed is:

1. A method for counting people and for determining the position of said people in a room of a building, the method comprising the steps of:
   a) activating a thermal imager;

b) the thermal imager capturing a raw thermal image of a scene included in said room;

c) deactivating the thermal imager by cutting-off the electrical power supply to the thermal imager;

d) after deactivating the thermal imager, acquiring, by a computer device operating independently of the activation or deactivation state of the thermal imager, a calibrated thermal image of the scene from said raw thermal image, and a measurement of the temperature of the thermal imager when capturing the raw thermal image, with said measurement being carried out by a temperature sensor connected to the thermal imager, the calibrated thermal image of the scene comprising at least one region of interest, with each region of interest being a hot spot corresponding to a respective person present in the scene;

e) the computer device comparing the calibrated thermal image of the scene with another calibrated thermal image, called calibrated comparison thermal image, of the scene acquired beforehand;

f) the computer device acquiring the number of people and the position of said people in the room.

2. The method according to claim 1, wherein step e) comprises subtracting the calibrated comparison thermal image from the calibrated thermal image of the scene so as to maintain the at least one region of interest in the calibrated thermal image of the scene.

3. The method according to claim 1, further comprising, prior to step e), applying at least one filter for identifying people to the calibrated thermal image of the scene in order to identify the at least one region of interest from among the at least one hot spot.

4. The method according to claim 1, wherein an elapsed time between step a) and step c) is less than 1 s, preferably less than 50 ms, more preferably less than or equal to 20 ms.

5. The method according to claim 1, wherein the calibrated comparison thermal image is acquired between 1 min and 4 min before step a), preferably between 1 min and 2 min before step a).

6. The method according to claim 1, wherein the calibrated thermal image of the scene is acquired without operating a shutter of the thermal imager.

7. The method according to claim 1, further comprising measuring the temperature of the thermal imager substantially concomitantly with step b).

8. The method according to claim 7, further comprising acquiring another calibrated comparison thermal image from the subtraction of the regions of interest from the calibrated thermal image.

9. A thermal imager, preferably with low resolution, comprising an array of thermal sensors, a lens and a computer device operating independently of the activation or deactivation state of the thermal imager, with the thermal imager being configured to implement the method according to claim 1, with steps d), e) and f) being implemented by the computer device.

10. A home automation detector comprising the thermal imager according to claim 9.

* * * * *